United States Patent
Kanno et al.

[11] Patent Number: 6,059,060
[45] Date of Patent: May 9, 2000

[54] MOTOR-OPERATED WHEELCHAIR

[75] Inventors: Nobuyuki Kanno; Junji Terada, both of Iwata, Japan

[73] Assignee: Yamaha Hatsudoki Kabushiki Kaisha, Japan

[21] Appl. No.: 09/029,474
[22] PCT Filed: Jun. 27, 1997
[86] PCT No.: PCT/JP97/02231
   § 371 Date: Feb. 25, 1998
   § 102(e) Date: Feb. 25, 1998
[87] PCT Pub. No.: WO98/00086
   PCT Pub. Date: Jan. 8, 1998

[30] Foreign Application Priority Data

Jul. 1, 1996 [JP] Japan ..................................... 8-171505

[51] Int. Cl.[7] ...................................................... B60K 7/00
[52] U.S. Cl. .......................... 180/65.8; 180/65.5; 180/907
[58] Field of Search ................... 180/65.1, 65.5, 180/65.6, 65.8, 65, 907; 318/66, 67, 68, 478, 488, 489; 310/67 R

[56] References Cited

U.S. PATENT DOCUMENTS

| | | | |
|---|---|---|---|
| 5,197,559 | 3/1993 | Garin, III et al. | 180/65.1 |
| 5,199,520 | 4/1993 | Chen | 180/65.5 |
| 5,477,935 | 12/1995 | Chen | 180/65.5 |
| 5,555,949 | 9/1996 | Stallard et al. | 180/6.5 |
| 5,771,988 | 6/1998 | Kikutani et al. | 180/65.5 |
| 5,878,829 | 3/1999 | Kanno et al. | 180/65.5 |

*Primary Examiner*—Richard M. Camby
*Attorney, Agent, or Firm*—Knobbe, Martens, Olson & Bear, LLP

[57] ABSTRACT

This invention relates to an electric motor operated wheelchair comprising right and left wheels (2) each provided with an electric motor unit with electric power supplied from a battery (46) disposed on one side wheel (2) through a wiring harness (electric cables) (45), (51) and a main switch (28) to each of the electric motor units, wherein the main switch (28) and a switch lever (29) for driving the switch (28) are integrated at least with the electric motor unit on the side where the battery (46) is located.

Therefore, according to the invention, the wiring harness (45) for interconnecting the main switch (28) and the electric motor unit do not appear outside the vehicle body frame (3), the number of electric cables and associated components is reduced to a minimum, the structure is simplified, and ease of attaching and removing the wheels (2) is improved.

13 Claims, 16 Drawing Sheets

MOTOR-OPERATED WHEELCHAIR

FIELD OF THE INVENTION

This invention relates to a motor-operated wheelchair using electric power from an electric motor unit as driving power or assist power. Here, the motor-operated wheelchair includes manually operated, motor-assisted wheelchairs, and motor-operated wheelchairs controlled with a joystick.

BACKGROUND ART

The applicant has previously proposed the above-mentioned kind of wheelchair (in Japanese patent application Nos. Hei-7-172086, Hei-7-27397, etc.) in which right and left hand wheels are respectively provided with electric motor drive units energized with a battery disposed on one wheel side through electric cables and a main switch.

However, since the motor-operated wheelchair proposed as described above has the main switch attached on the vehicle body frame side, there is a problem that one has to take pains in deciding how to route the long cable interconnecting the main switch and the electric motor unit.

Another problem with such a kind of wheelchair is that when it is intended to make the wheels and the electric motor units removable from the vehicle body frame for the convenience of transport, an electric cable coupler has to be interposed somewhere along the electric cables between the main switch and the electric motor unit so that the electric cables and the wheel may be disconnected at the coupler. This increases the number of components and makes the constitution complicated.

Therefore, an object of the invention is to provide a motor-operated wheelchair which is simple in constitution and facilitates attachment and removal of the wheels while minimizing the number of electric cables and associated components.

By the way, the motor-operated wheelchair having right and left wheels including respective electric motor units removable from the vehicle body frame requires rotation holding structure because the driving reactional forces of the electric motor units must be received with the vehicle body frame.

However, the conventional rotation holding structure is such that the rotation of the electric motor unit is held by mutual engagement of metallic components and therefore uncomfortable metallic noise is produced from the rotation holding structure every time the intermittent driving force (assist force) occurs.

Therefore, another object of the invention is to provide a motor-operated wheelchair in which the wheels may be attached and removed without play or rattle, and abnormal noise is prevented from being produced.

Another problem with the motor-operated wheelchair is that, since the battery is disposed only on the side of one wheel, the electric cable for energizing the electric motor unit on the other wheel becomes long, and one has to take pains to decide how to lay the cable to the electric motor unit on the other wheel.

The necessary length of the electric cable varies with the battery mounting position and the size and type of the wheelchair. Therefore, the cable length is usually set to a certain value having some margin so that the same cable and electric motor may cover all types and sizes of the wheelchair. The surplus cable length brings about another problem of slack along the cable depending on the size of the wheelchair.

Another problem with the conventional motor-operated wheelchair is that, since the coupler for interconnecting the electric cables is exposed outside, the coupler cannot be made highly water-proof and so may invite electric troubles.

Therefore, another object of the invention is to provide a motor-operated wheelchair capable of absorbing slack in the electric cables, and preventing electric troubles from occurring clue to water infiltration.

DISCLOSURE OF THE INVENTION

To accomplish the above objects, the invention of claim 1 is a type of motor-operated wheelchair comprising right and left wheels each provided with an electric motor unit including an electric motor and its control means, and a battery disposed on the side of one electric motor unit and supplying electric power through electric cables and a main switch to both electric motor units, characterized in that at least one of the electric motor units has a built-in main switch.

The invention of claim 2 is the invention of claim 1, characterized in that a switch lever for driving the main switch is integrally built in at least the electric motor unit on the side on which the battery is disposed.

The invention of claim 3 is the invention of claim 2, characterized in that the length and direction of the switch lever are adjustable.

The invention of claim 4 is the invention of claim 2 or 3, characterized in that the switch lever end is provided with a display section.

The invention of claim 5 is the invention of claim 1, characterized in that the display section is disposed on the inside of at least one wheel tire.

The invention of claim 6 is the invention of claim 4 or 5, characterized in that the display section includes an LED.

The invention of claim 7 is the invention of claim 1, characterized in that spokes for supporting a hand rim for rotating each of the wheels is curved toward inside in the vehicle width direction relative to the hand rim.

The invention of claim 8 is the invention of claim 1, characterized in that each of the wheels is attached removably to the vehicle body frame and that a projection formed at a position radially spaced from the wheel shaft of the electric motor unit is received through an elastic body with the vehicle body.

The invention of claim 9 is the invention of claim 8, characterized in that a circular columnar pin is erected on the electric motor unit, circular holes of different diameters are concentrically formed in a metallic attachment case attached to the vehicle body frame, in the large diameter hole is fit a rubber damper with its inside diameter being approximately the same as the outside diameter of the pin, the diameter of the small diameter hole is set to be larger than the inside diameter of the rubber damper, and the pin is passed through the rubber damper and the small diameter hole of the attachment case.

The invention of claim 10 is the invention of claim 8, characterized in that a circular columnar pin is erected on the electric motor unit, holes of different sizes elongate in the direction generally at right angles to the direction of reaction of the driving force of the electric motor unit are formed in a metallic attachment case attached to vehicle body frame, in the large elongate hole is fit a cylindrical rubber damper with its inside dimension being approximately the same as the outside diameter of the pin, and the pin is passed through the rubber damper and the small dimension hole of the attachment case.

The invention of claim 11 is the invention of claim 1, characterized in that a storage space is formed below a battery holder for holding the battery, and part of the electric cable is stored in the storage space to adjust the length of the electric cable.

The invention of claim 12 is the invention of claim 11, characterized in that the coupler for interconnecting the electric cables is secured and held in the upper part of the storage space.

The invention of the claim 13 is the invention of the claim 11 or claim 12, characterized in that the securing means is provided at part of the electric cable for introducing the cable into the holding space.

Therefore, with the invention of claim 1, the electric cable for interconnecting the main switch and the electric motor unit does not appear on the vehicle body frame side because the electric motor unit including the electric motor and the battery are disposed on the wheel side and also the main switch is disposed within at least one of the electric motor units. As a result, the number of electric cables and related parts are reduced to a minimum, the structure is simplified, and the ease of attaching and removing the wheels is improved.

With the invention of claim 2, the switch lever for actuating the main switch is integrated with the electric motor unit located at least on the side where the battery is disposed. As a result, the electric motor unit and the wheel on the opposite side which are attached and removed more frequently may be made compact in size and so the ease of attaching and removing these components is improved.

With the invention of claim 3, since the length and direction of the switch lever is adjustable the switch lever may be widely adapted to different sizes and shapes of the vehicle body frame.

With the invention of claim 4, 5, or 6, the display section for informing the rider of the remaining battery capacity, occurrence of troubles, etc. is disposed together with the main switch and the switch lever on the wheel. As a result, the structure is simplified, and the ease of attaching and removing the wheels is improved further.

With the invention of claim 7, spokes for supporting a hand rim for rotating each of the wheels is curved toward inside in the vehicle width direction. As a result, the fingers of the rider are less likely to be caught with the hand rim when the rider rotates the hand rim. Namely, the ease of operating the hand rim is improved.

With the invention of claim 8 or 9, the drive reaction force of the electric motor unit is absorbed with the deformation of the elastic body on the vehicle body frame side, namely shocks are absorbed and damped with the damping effect of the elastic body, and so the uncomfortable metallic noise from the rotation holding section is prevented from being produced. The wheels may be attached to and removed from the wheelchair having the electric motor unit without play or rattle by inserting the projection erected on the electric motor unit into the elastic body.

With the invention of claim 10, since the projection erected on the electric motor unit engages with the elongate hole formed on the vehicle body frame side, the right and left wheels may be easily attached to the vehicle body frame even if the accuracy of the components is poor. Since the holes elongate in the direction generally normal to the direction of the drive reaction force of the electric motor unit are formed on the vehicle body frame side, the projections engage tightly with the elongate holes in the direction of the drive reaction force so that the rotation of the electric motor unit is securely held.

With the invention of claim 11 or 12, the holding space formed below the battery serves to take up the surplus length or the slack of the electric cable so that the external appearance of the motor-operated wheelchair is improved and that various inconveniences associated with the cable slack are eliminated. Since the couplers are housed in the storage space and held in the upper part in the storage space, the couplers may secure high waterproof property to securely prevent electric troubles due to water infiltration.

With the invention of claim 13, the electric cable pulled into the storage space cannot be pulled back to the outside, and so the slack of the electric cable is securely taken up in the storage space.

THE BEST FORM FOR IMPLEMENTING THE INVENTION

Figure 1:
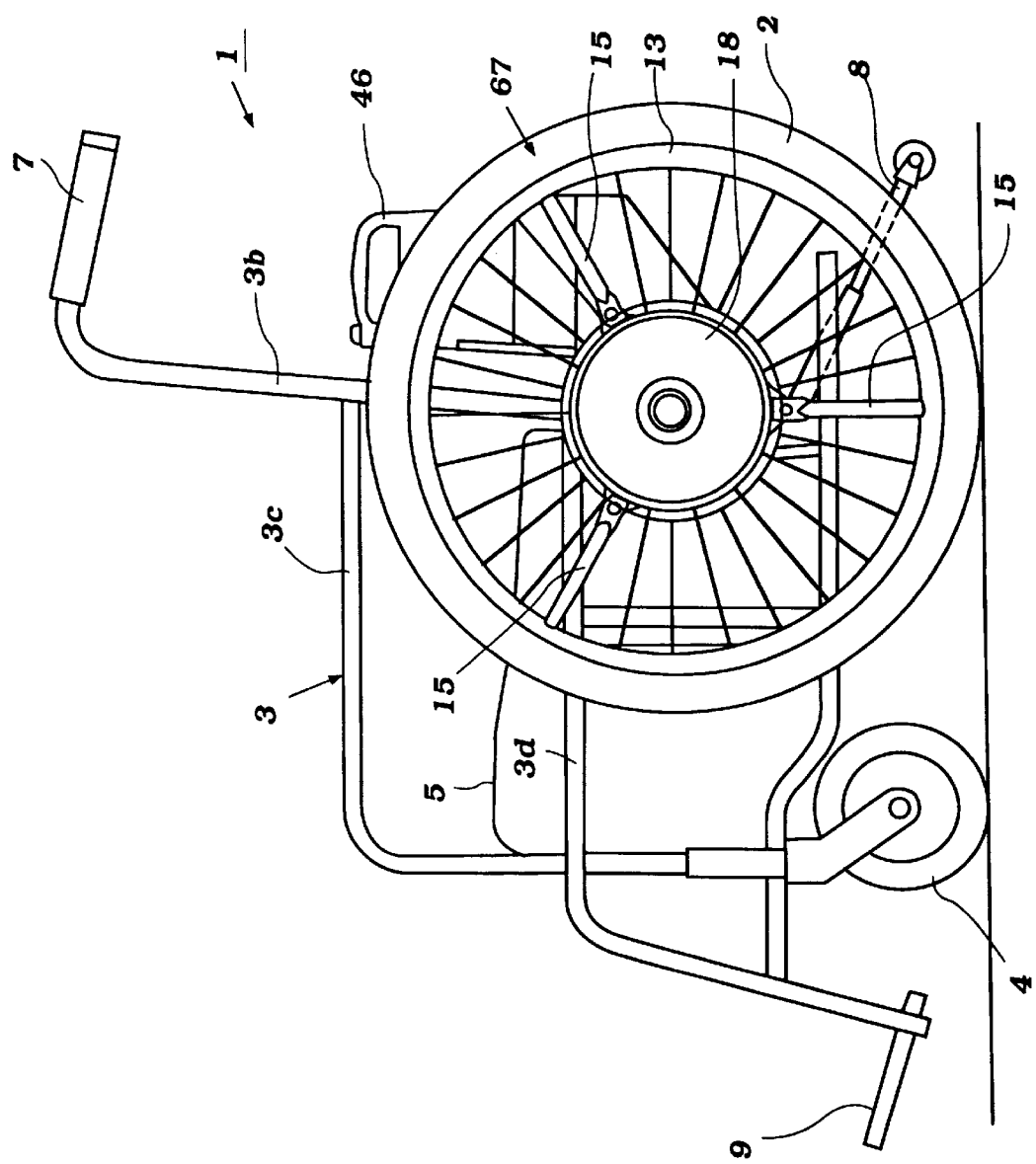
FIG. 1 is a side view of a motor-operated wheelchair of the invention.
Figure 2:
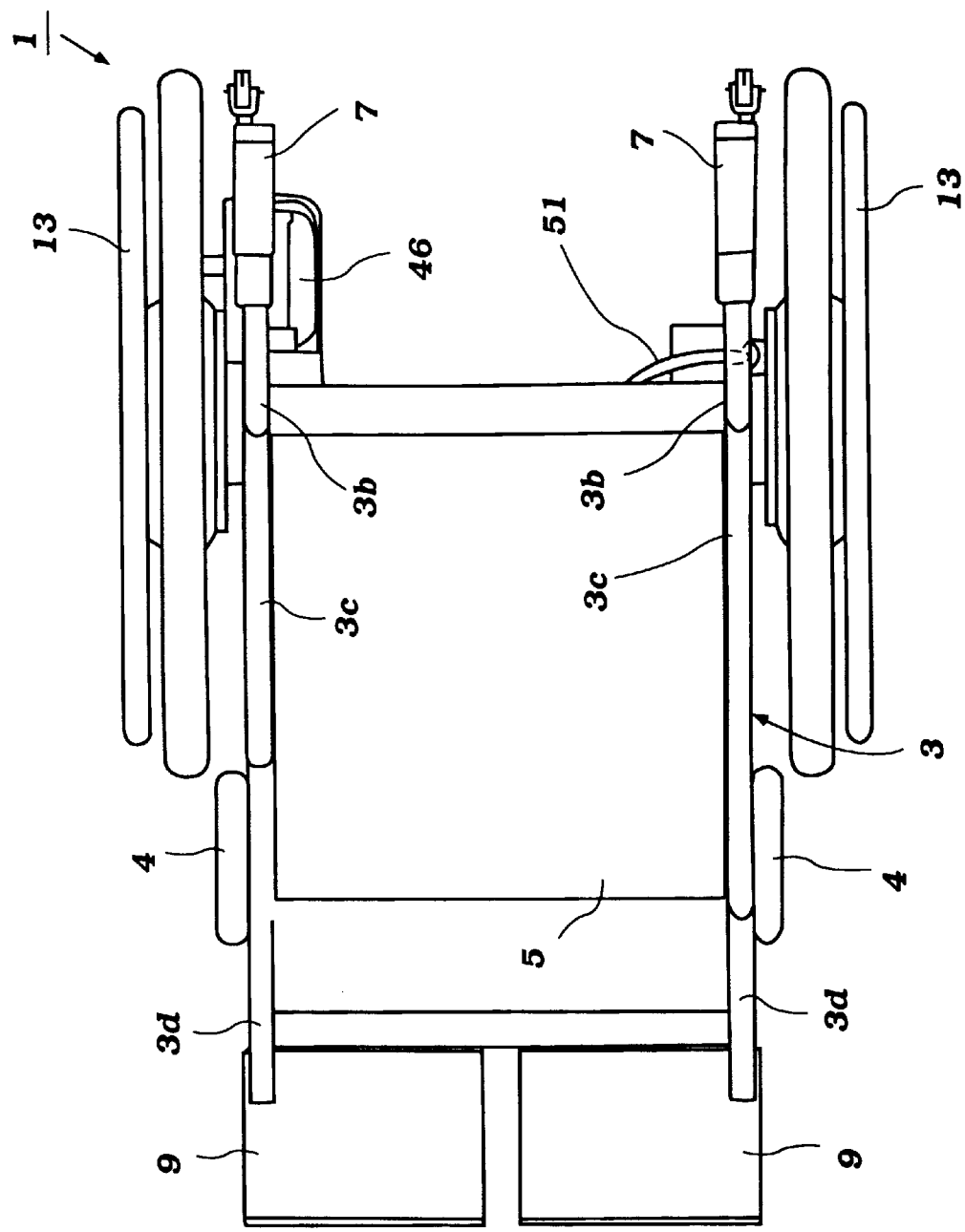
FIG. 2 is a plan view of the same wheelchair.

Embodiments of the invention will be hereinafter described in reference to the appended drawings.

In the manually operated, motor-assisted wheelchair 1 of the invention, assist powers in proportion to the manual forces applied to the right and left wheels 2 are applied respectively to the right and left wheels 2. The wheelchair 2 is constituted with an existing folding type of manual wheelchair body frame 3 made of pipe materials, and the wheels 2 removably attached to the right and left sides of the wheelchair body 3. The front and rear of the pipe frame 3 of the vehicle body are supported with paired right and left casters 4 and wheels 2 for free rolling.

Figure 3:
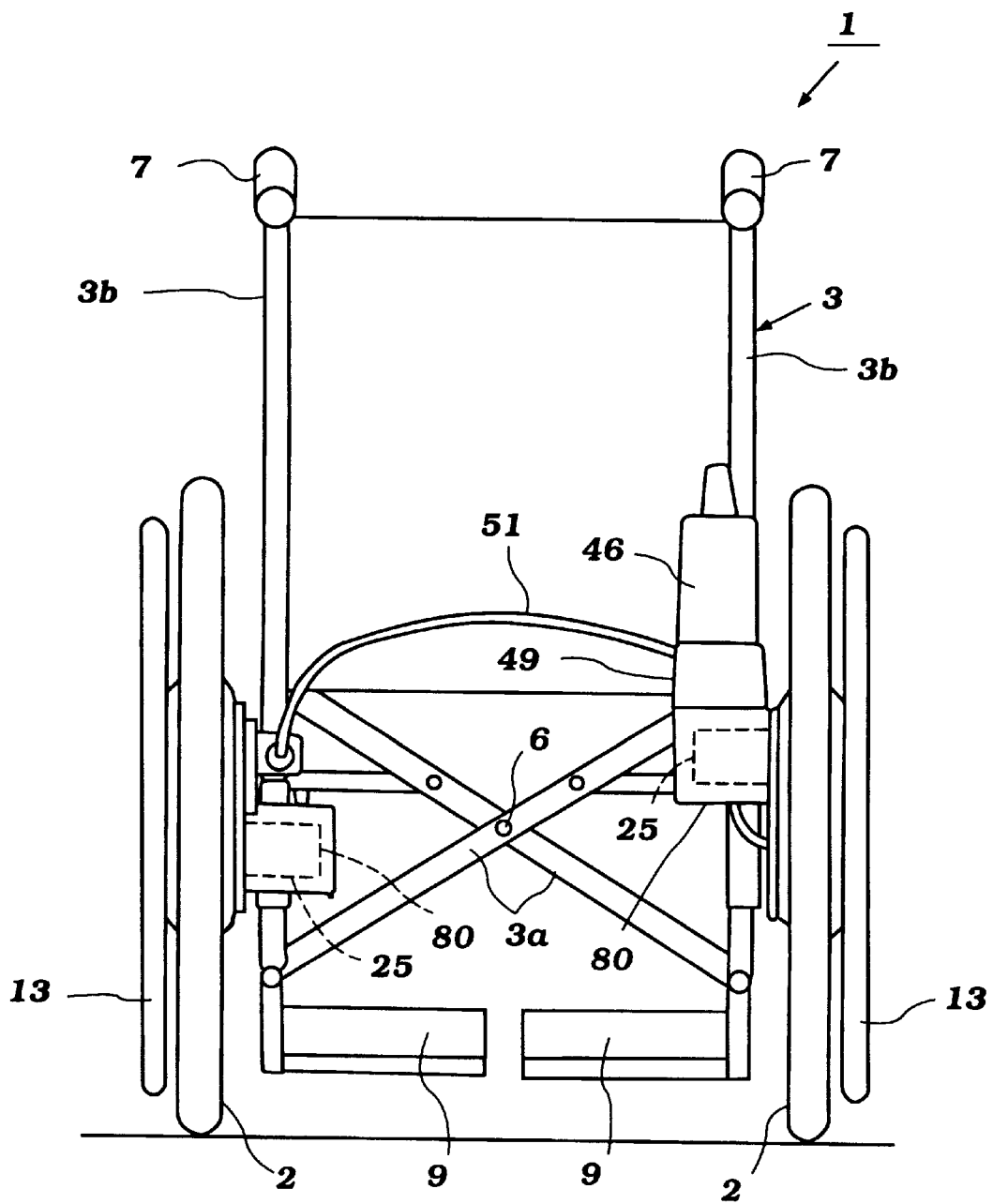
FIG. 3 is a rear view of the same wheelchair.

A seat 5 made of cloth for a rider to sit on is disposed in the center of the frame 3. In FIG. 1, the seat 5 is shown as a cloth seat with a removable cushion placed on it. As shown in FIG. 3, the frame 3 has paired front and rear cross members 3a. The X-shaped cross members 3a are pivoted at their intersection by means of a shaft 6 so that the vehicle body may be folded about the shaft 6.

Paired right and left back pipes 3b are erected in the rear part of the frame 3. The upper ends of the back pipes 3b are bent rearward and covered with grips 7 for a tending person. A willy bar 8 is attached to the inside of each of the wheels 2 so as to extend obliquely rear downward (to the right in FIG. 1) for preventing the wheelchair from falling.

Paired right and left elbow pipes 3c extend from the middle height position of the back pipes 3b of the frame 3 horizontally forward of the vehicle body and then bend downward at generally right angles, with their ends provided with casters 4 for free rolling. Front ends of paired right and left seat pipes 3d disposed below the elbow pipes 3c extend obliquely down forward, with their extended ends (fore-ends) provided with paired steps 9.

Figure 5:
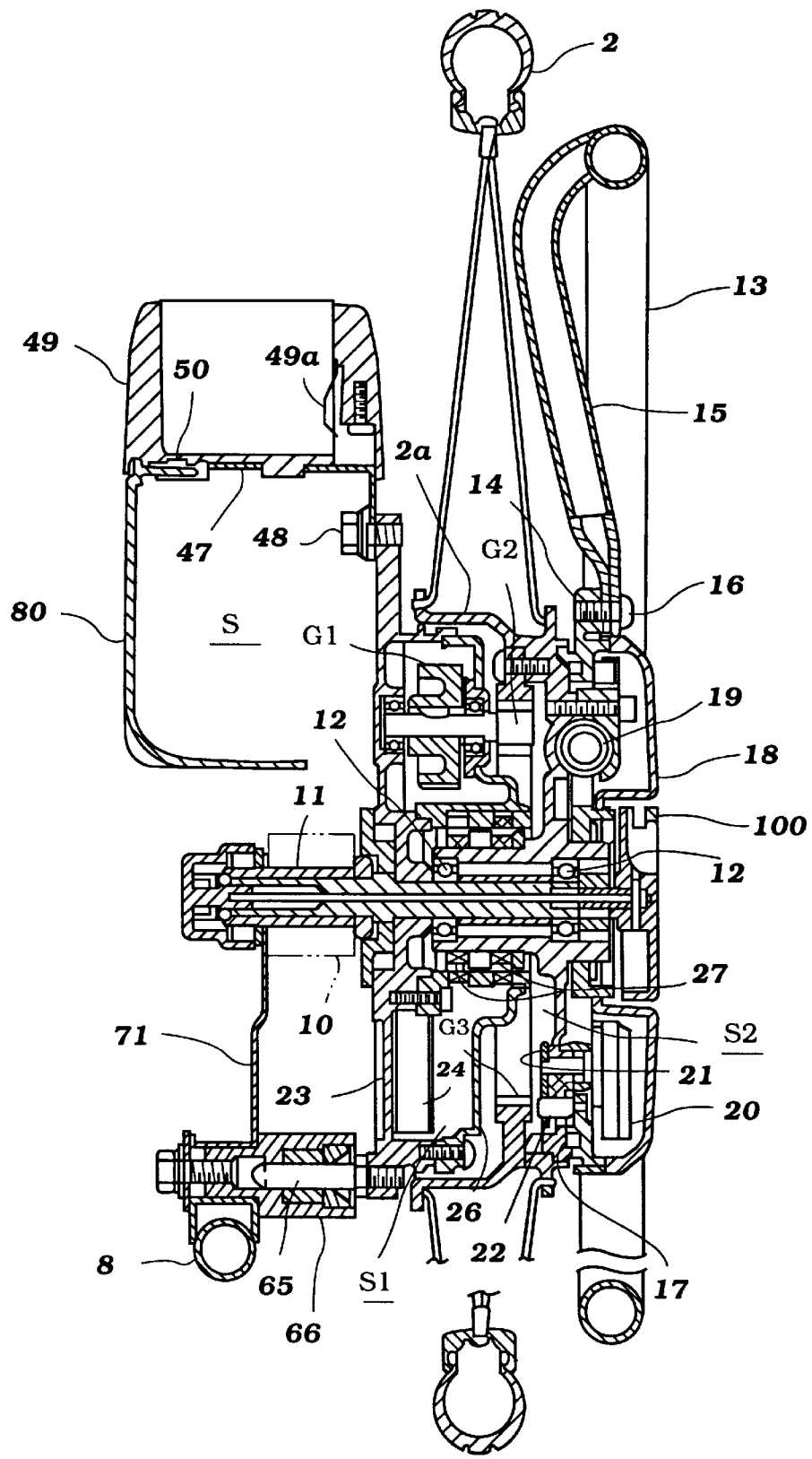
FIG. 5 shows a cross section A—A in FIG. 4

As shown in FIG. 5, each of the wheels 2 is supported for free rotation through two bearings 12 on a wheel shaft 11 supported on a wheel attachment boss 10 welded to the frame 3. A hand rim 13 for the rider to turn by hand is disposed outside of each of the wheels 2. The hand rim 13 is attached through three spokes 15 to a disk 14 rotatably supported with a boss integrally formed with a hub 2a of the wheel 2 using bolts 16. Therefore, the hand rim 13 may rotate independently of the wheel 2. In this embodiment as shown in FIG. 5, a seal ring 17 made of an elastic material is interposed between the hub 2a of the wheel 2 and the disk 14. The disk 14 is covered with a cover 18 connected to the disk 14. The seal ring 17 has the function of a friction damper for suppressing circumferential vibration due to inertia of the disk 14 as well as the function of sealing. In this embodiment, spokes 15 is curved more inside than the hand rim 3 in the vehicle width direction. As a result, the fingers of the rider are less likely to be caught with the hand rim 13 when the rider rotates the hand rim. Namely, the ease of operating the hand rim 13 is improved.

As shown in FIG. 5, the hand rim 13 is elastically supported at its three circumferential points on the hub 2a by means of springs 19 so as to be rotatable in both directions relative to the wheel 2.

A potentiometer 20 for detecting the magnitude and direction of the manual force applied to the hand rim 13 (disk 14) from the amount and direction of rotation of the wheel 2 (hub 2a) relative to the hand rim 13 is attached to the outside end surface of the hub 2a so that the position of the potentiometer 27 is adjustable. One end of a lever 21 is connected to the end of the input shaft of the potentiometer 27. The other end of the lever 21 has an elongate hole which is in engagement with a pin 22 projecting from the disk 14.

As shown in FIGS. 5 through 7, and 10, a stationary disk 23 is disposed inside, with respect to the vehicle width direction, each of the paired wheels 2 and secured to the wheel shaft 11. A controller 24 constituting a control means and an electric motor 25 as a driving source are mounted on the stationary disk 23.

As shown in FIG. 5, inside each of the wheels 2 is formed a space defined with the stationary disk 23. The space is divided with a ring-shaped partition wall 26 into a chamber S1 and a chamber S2. The controller 24 and a rotation transformer 27 are housed in the chamber S1. The rotation transformer 27 performs signal transmission between the controller 24 and the potentiometer 20.

The assist power produced with each of the electric motors 25 is transmitted through power transmission means including a belt transmission mechanism G1 and gears G2, G3 to each of the wheels 2.

The above-described manual force detection means constituted with the spring 19, and the potentiometer 20; signal transmission means constituted with the rotation transformer 27, control means constituted with the controller 24; and power transmission means constituted with the electric motor 25, the belt transmission mechanism G1, and gears G2, G3 constitute an assist power unit. The assist power unit is disposed around the wheel shaft 11 of the stationary disk 23 and the hub 2a of each of the wheels 2 in radially and axially compact dimensions. Each of the wheels 2 including the assist power unit within the hub 2a may be attached to or removed from the vehicle body as mentioned before. Each of the wheels 2 may be easily removed together with the wheel shaft 11 by raising a lever 100 shown in FIG. 5 and drawing out the wheel 2.

Here, a rotation holding structure for the electric motor unit will be described in reference to FIGS. 5, 6, 8, and 9. While the description of the rotation holding structure here is made with respect to the right hand wheel 2 only, the rotation holding structure for the left hand wheel 2 is identical to that for the right hand wheel 2. Therefore the description for the left hand wheel is omitted.

As shown in FIG. 5, a columnar metallic pin 65 is screw-attached near the periphery of the stationary disk 23 of the electric motor unit. The pin 65 projects inward with respect to the vehicle width direction.

Figure 8:
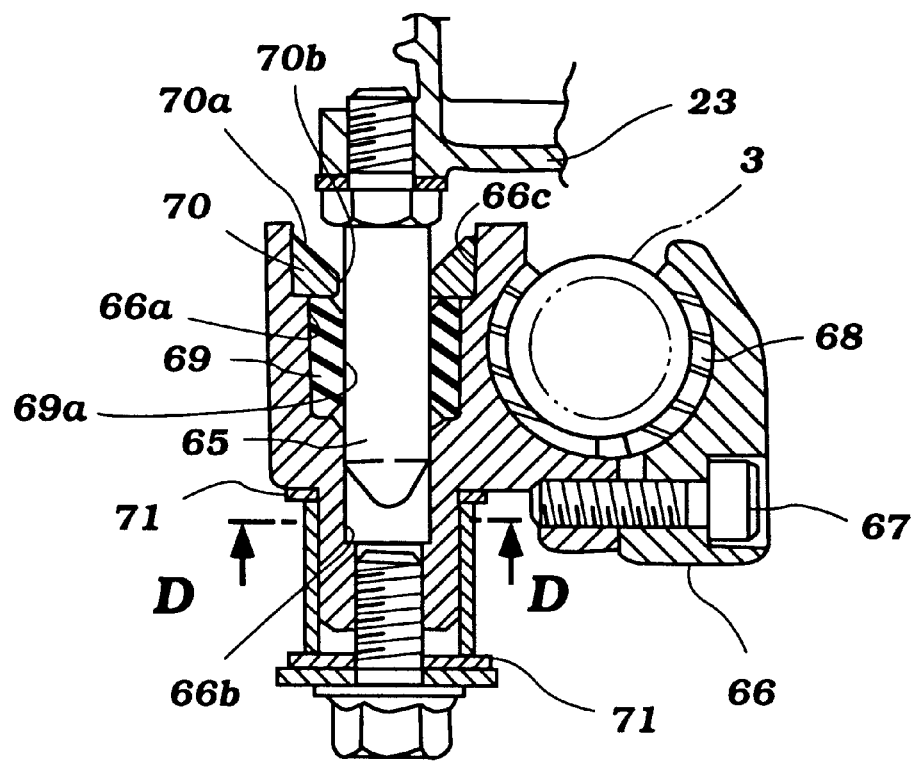
FIG. 8 shows an enlarged cross section C—C in FIG. 6.
Figure 9:
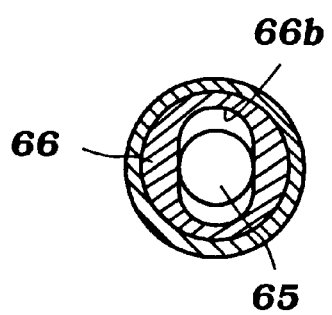
FIG. 9 shows an enlarged cross section D—D in FIG. 8

On the other hand as shown in FIG. 8 in detail, a metallic attachment case 66 consisting of two parts is attached to the vehicle body frame 3 at a position apart from the wheel shaft 11 by means of a bolt 67. A metallic collar (spacer) 68 is interposed between the vehicle body frame 3 and the attachment case 66.

The attachment case 66 is formed with elongate holes 66a, 66b (See FIG. 9) of different sizes in the direction generally normal (radial) to the line of action (circumferential direction about the wheel shaft 11) of the drive torque generated with the electric motor unit.

In one elongate hole 66a is fit a rubber damper 69 of the same external shape as that of the elongate hole 66a and having an elongate hole 69a of generally the same width as the outside diameter of the pin 65. The rubber damper 69 is prevented from coming off the elongate hole 66a with an aluminum stop ring 70. The stop ring 70 is also formed with an elongate hole 70b. The width of the elongate hole 70b is the same as the width of the elongate hole 66b and greater than the width of the elongate hole 69a of the rubber damper 69.

By the way, the stop ring 70 has the shape of a true circle and positioned with an appropriate positioning means so that its elongate hole 70b is aligned with the elongate hole 66b located on the attachment case 66 side. The outside end surface of the stop ring 70 is formed with a conical surface 70a widening toward the outside. FIG. 8 also shows a positioning plate (FIGS. 5 and 6) 71 for the attachment case 66 relative to the vehicle body frame 3, with its one end supported coaxially with the wheel shaft 11.

When the wheel 2 is attached to the vehicle body, rotation of the stationary disk 23 is prevented as the pin 65 planted in the stationary disk 23 as shown in FIG. 8 is guided with the conical surface 70a of the stop ring 70 on the attachment case 66 side, through the elongate hole 70b, and into the elongate hole 69a of the rubber damper 69 and the elongate hole 66b. Here, since the width of the elongate hole 69a of the rubber damper 69 is chosen to be generally the same as the outside diameter of the pin 65, the pin 65 may be snugly fit into and received with the elastic the rubber damper 69 without play or rattle so that the wheel 2 may be smoothly attached.

Also as described above, since the width of the elongate hole 70b of the stop ring 70 and the width of the elongate hole 66b of the attachment case 66 are chosen to be greater than the width of the elongate hole 69a of the rubber damper 69, a certain gap is present in the unloaded state between the pin 65 and the elongate hole 70b of the stop ring 70 and between the pin 65 and the elongate hole 66b of the attachment case 66.

As described above, when the wheel 2 is attached to the vehicle body, the rotation of the stationary disk 23 is easily stopped by inserting the pin 65 into the elongate hole 7b of the stop ring 70, and the elongate hole 66b and the rubber damper 69 on the attachment case 66 side, so that the wheel 2 may be attached easily without play. Here, since the pin 65 is inserted into elongate holes in the stop ring 70, rubber damper 69, and attachment case 66, the wheel 2 may be attached easily to the vehicle body frame 3 even if the accuracy of the components is poor. That is to say, the attachment case 66, rubber damper 69, and stop ring 70 are formed with elongate holes 66b, 69a, and 70b, respectively, which are elongate in the radial direction (generally normal to the line of action of the drive reaction force of the electric motor unit), and the pin 65 engages with those elongate holes 66b, 69a, and 70b. Therefore, the pin 65 may easily engage with the attachment case 65 even if the accuracy of the components is poor. Thus, the rotation holding structure for the electric motor unit is constituted.

Since the pin 65 engages tightly in the acting (circumferential) direction of the drive reaction force with those elongate holes 66b, 69a, and 70b, rotation of the electric motor unit is securely held.

By the way, while the elongate holes 66b. 69a, and 70b are used for engagement with the pin 65 in this embodiment, there is no problem if those elongate holes are replaced with circular holes.

Figure 6:
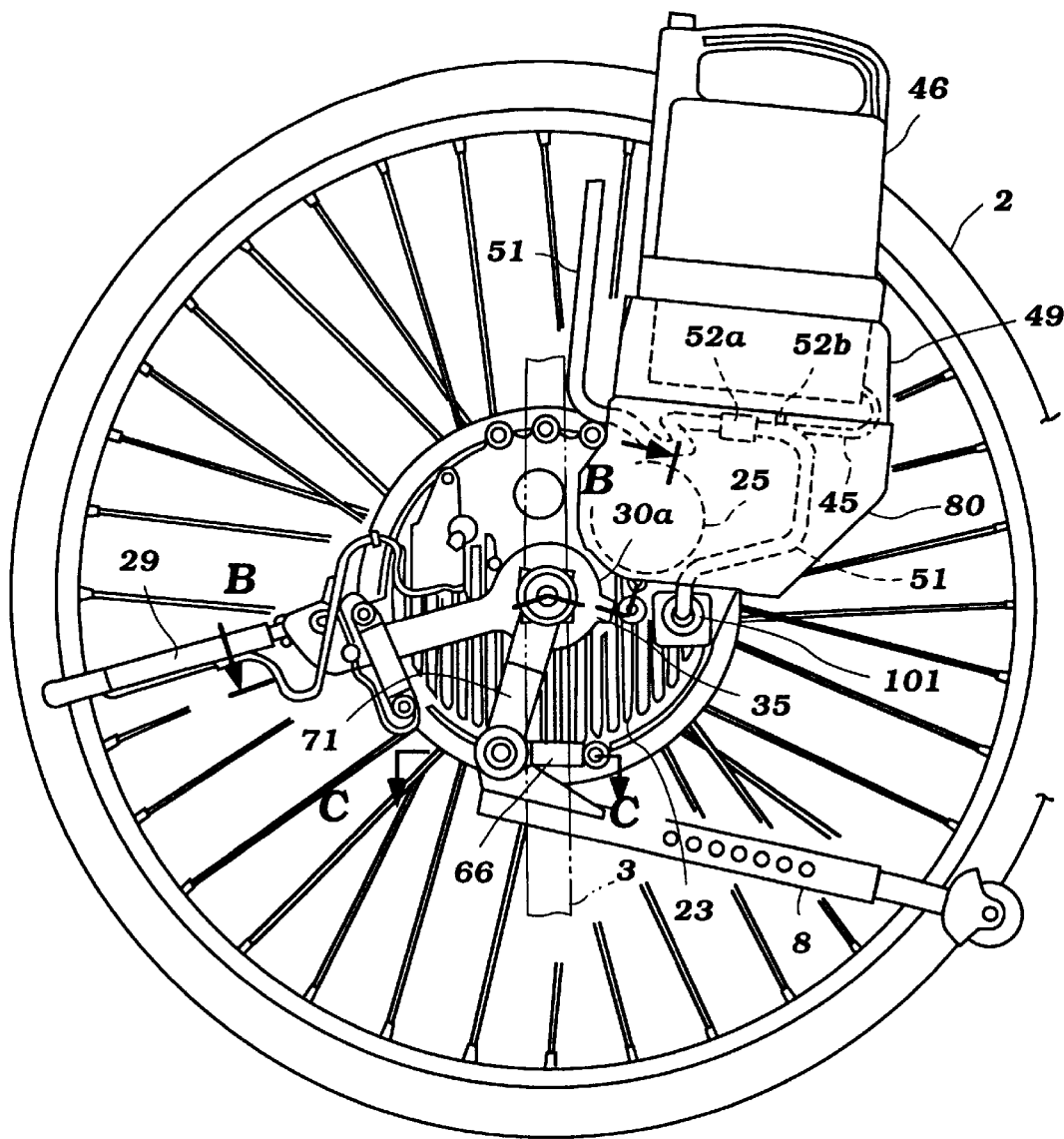
FIG. 6 is a view as seen from inside of the right hand side wheel of the same wheelchair.
Figure 7:
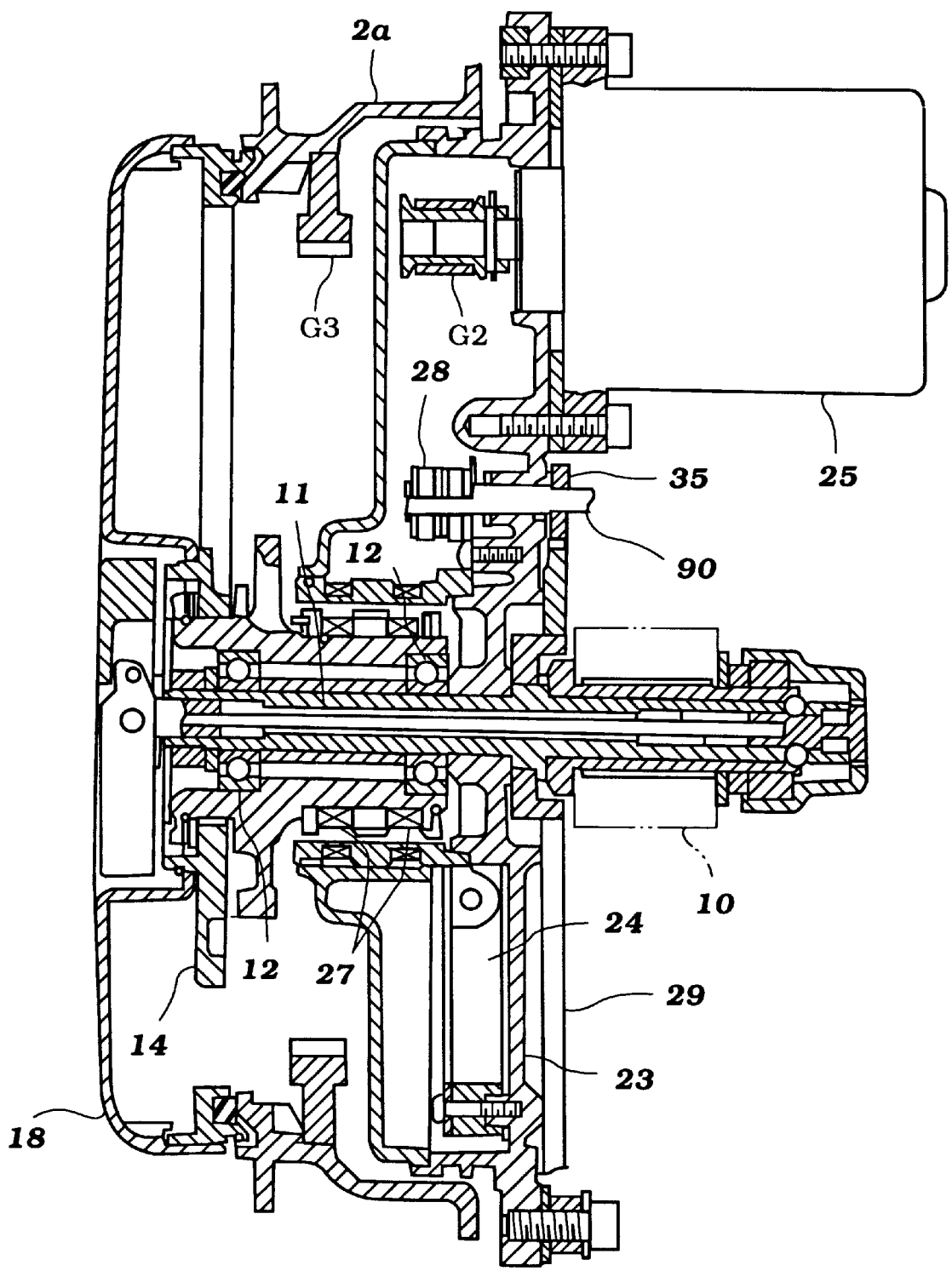
FIG. 7 shows an enlarged cross section B—B in FIG. 6.
Figure 11:
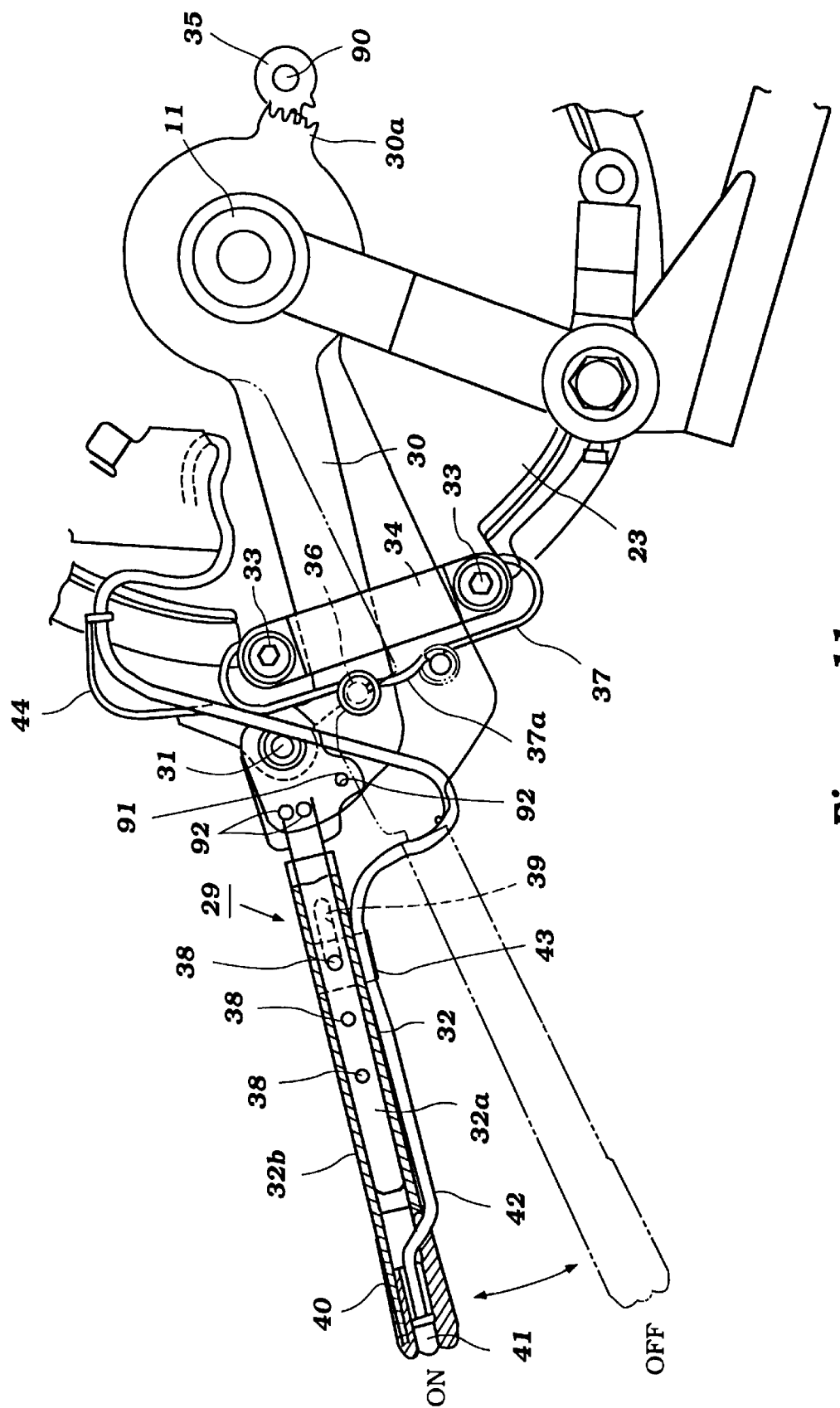
FIG. 11 is an enlarged detailed view partially broken away of the switch lever portion of the right hand side wheel.

In the manually operated, motor-assisted wheelchair 1 of this embodiment, a main switch 28 (See FIG. 7.) is secured to the stationary disk 23 and enclosed in the hub 2a of the right hand wheel 2 so as to be turned on and off by the swinging operation of a switch lever 29 shown in FIGS. 6, 7, and 11. The detailed structure of the switch lever 29 will be hereinafter described in reference to FIG. 11.

The switch lever 29 is disposed for free swinging to face the vehicle body side of the right hand wheel 2, and constituted with a neutral arm 30 pivoted for free swinging on the wheel shaft 11 and with a lever 32 attached by means of a bolt 31 to the end portion of the neutral arm 30.

The swing angle of the neutral arm 30 is restricted as the arm 30 is passed through a U-shaped lever stopper 34 secured to the stationary disk 23 by means of bolts 33. The base end portion of the arm 30 is partially formed with a gear 30a which engages with a sector gear 35 for driving the main switch 28 (See FIG. 7.). The sector gear 35 is connected through a shaft 90 to the main switch 28.

A projecting pin 36 planted at the tip of the neutral arm 30 engages with a guide spring 37 attached to the stationary disk 23. The guide spring 37 is formed with a raised portion 37a in its central area for the pin 36 ride over.

The lever 32 is constituted with a first lever 32a made of a solid round bar and attached to the fore-end portion of the neutral arm 30, and a second lever 32b made of a round pipe slidably fit over the outside surface of the first lever 32a. The length of the lever 32 is adjustable.

Namely, the first lever 32a is formed with three threaded holes 38 at suitable intervals, while the second lever 32b is formed with a hole 39 elongate in the axial direction. As a result, the length of the lever 32 may be suitably adjusted by bringing the bolt passed through the elongate hole 39 of the second lever 32b into screw engagement with one of the three screw holes 38, sliding the second lever 32b along the first lever 32a for fine adjustment, and tightening the bolt. Also the direction of the lever 32 may be adjusted in three directions by loosening a bolt 31, rotating the entire lever 32 about the bolt 31 relative to the neutral arm 30, and bringing a pin 91 projecting from the arm 30 into engagement with one of three round holes 92 (in the embodiment shown in FIG. 11, the lowermost round hole 92) bored in the neutral arm 30.

A grip 40 is fit over the fore-end of the lever 32 (second lever 32b). A pilot lamp 41 consisting of an LED (light emitting diode) is embedded inside the fore-end of the lever 32. A lead 42 from the pilot lamp 41 exits the lever 32, held and laid with some slack, and finally connected to the controller 24 (See FIG. 5). In the present embodiment, the pilot lamp 41 goes out after lighting up for a specified period of time when the main switch 28 is turned on, flashes when the remaining capacity of the battery 46 (to be described later) decreases, and lights up when the wheelchair 1 stops due to a trouble or a low battery voltage to inform the rider to that effect.

When the rider swings the switch lever 29 up and down about the wheel shaft 11, the movement is transmitted through the gears 30a and 35 to the main switch 28 so that the switch 28 is turned on and off. Specifically, the switch 28 is turned on when the switch lever 29 is in the position shown with solid lines in FIG. 11. When the switch lever 29 is swung from the on state down to the state shown with dash-and-double-dotted lines in FIG. 11, the main switch 28 is turned off. During the swinging operation of the switch lever 29 to the on and off position shown with solid and phantom lines respectively, a click feeling is given as the pin 36 slides over the raised portion 37a formed on the guide spring 37, and the switch lever 29 is held in the position shown with solid lines or with dash-and-double-dotted lines in FIG. 11.

In the manually operated, motor-assisted wheelchair 1 of this embodiment, as shown in FIGS. 1 and 6, a battery 46 is removably mounted on the right hand wheel 2 side.

That is to say, as shown in FIG. 5, a bracket 47 is attached using a bolt 48 to the stationary disk 23 of the right hand wheel 2. On the top of the bracket 47 is attached a battery holder 49 using a screw 50. The battery 46 may be installed in and removed from the battery holder 41 in the vertical direction. To the battery holder 49 is joined a connection terminal 49a from which wiring harnesses 45, 51 come out.

With the above-described arrangement, when a connection terminal (not shown) disposed on the battery 46 side is connected to the connection terminal 49a on the battery holder 49 side and the main switch 28 is turned on by the swinging movement of the switch lever 29 in the state of the battery 46 being installed in the battery holder 49, the battery 46 energizes and drives both the electric motor units provided on the right and left wheels 2 through wiring harnesses 45, 51.

Figure 10:
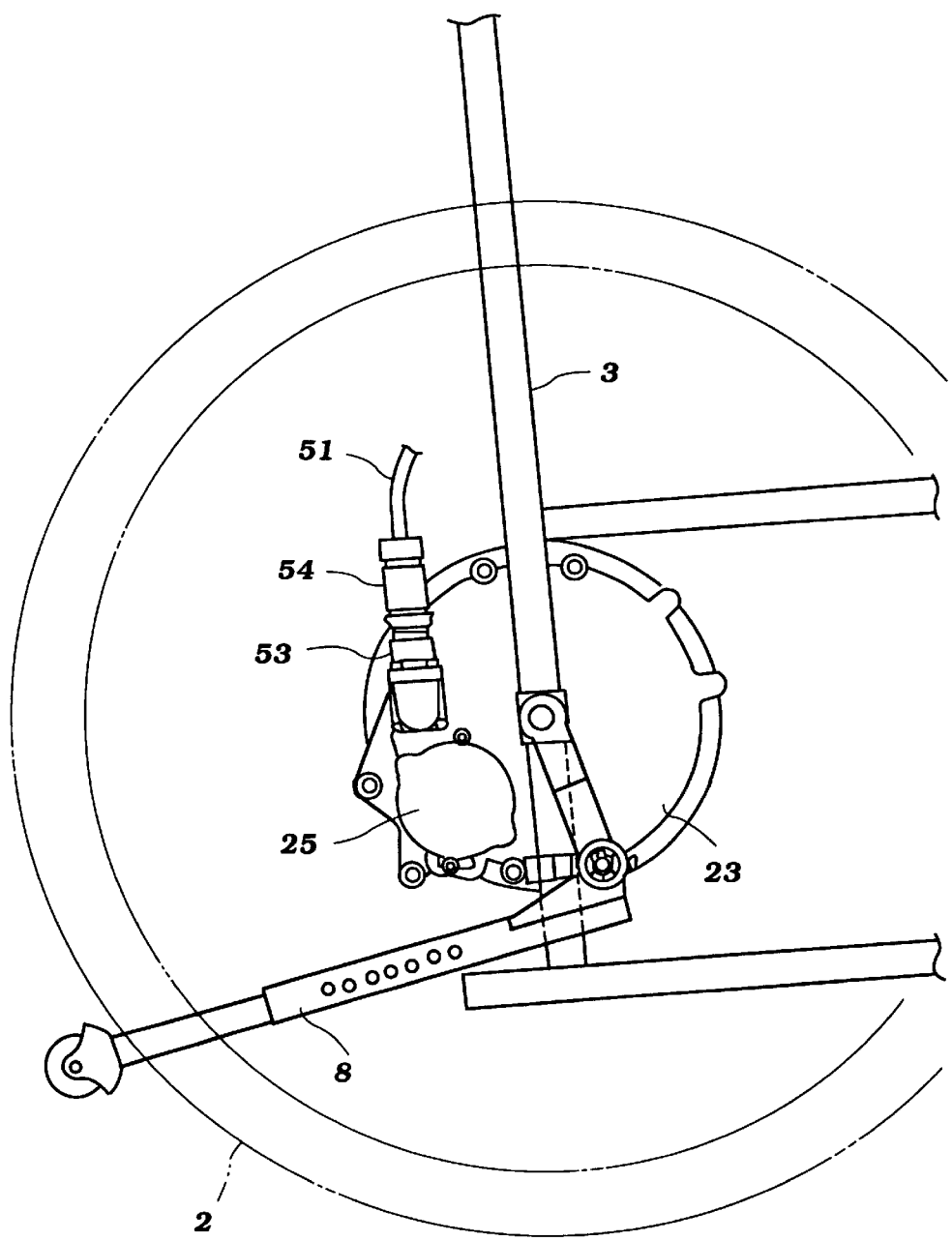
FIG. 10 is a view as seen from inside of the left hand side wheel of the same wheelchair.

As shown in FIG. 6, the wiring harnesses 45, 51 are electrically interconnected through couplers 52a, 52b. One end of the wiring harness 51 passes through a grommet 101 and is electrically connected to the electric motor unit on the right hand wheel 2 while its other end is electrically connected to the electric motor unit on the left side wheel 2 as shown in FIG. 10. As shown in FIG. 10, a coupler 53 is attached to the stationary disk 23 on the left hand wheel 2. The wiring harness 51 may be easily connected electrically to the electric motor unit on the left hand wheel 2 by simply pushing a coupler 54 connected to the end of the wiring harness 51 into the coupler 53.

Here, a structure for storing the wiring harness 51 is described in reference to FIG. 11.

Figure 12:
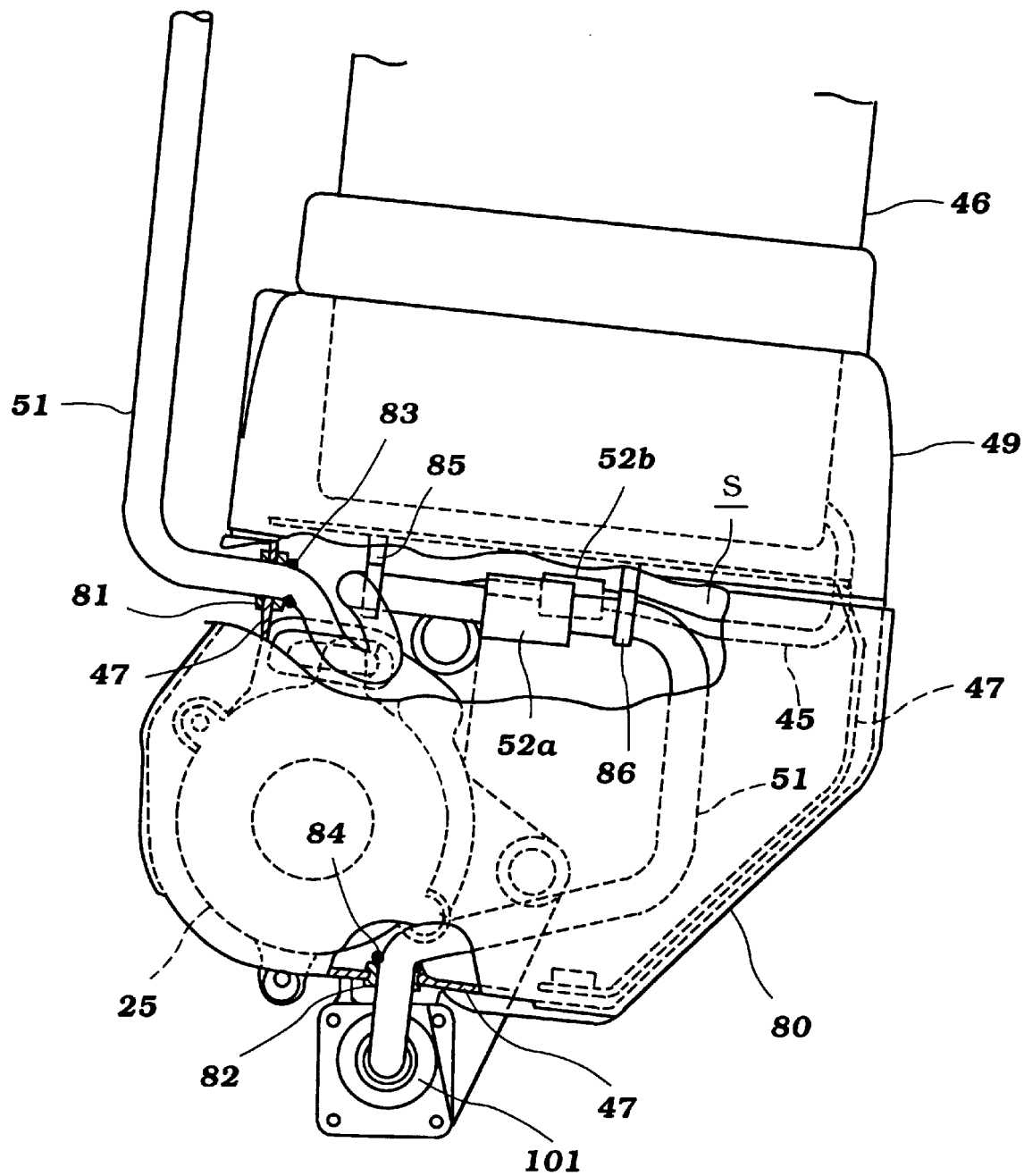
FIG. 12 is a side view as seen from inside of the battery container area partially broken away.

In this embodiment, as shown in FIG. 12, a storage space S surrounded with a motor cover 80 is formed below the battery holder 49 to store part of the wiring harness 51, and the couplers 52*a*, 52*b*.

The wiring harness 51 is made slightly longer than necessary, and the surplus length of the wiring harness 51 is passed through cuts formed in the front and bottom surfaces of the motor cover 80, introduced into and stored in the storage space S in the motor cover 80. As a result, the surplus length portion of the wiring harness 51 drawn into the storage space S is bent as illustrated and stored so that the length (exposed outside the storage space S) of the wiring harness 51 is adjusted and the slack is taken up. Thus, external appearance of the manually operated, motor-assisted wheelchair 1 is improved and at the same time, various problems associated with the slack of the wiring harness 51 are eliminated.

By the way, cuts are also formed in the front and bottom surfaces of the bracket 47 so as to face the cuts in the front and bottom surfaces of the motor cover 80. Grommets 81, 82 are fit into those cuts. The inner sides of the grommets 81, 82 for the wiring harness 51 are secured with securing means or wedge members 83, 84. Specifically, after the surplus length of the wiring harness 51 is drawn into the storage space S to prevent a slack of the wiring harness 51, two introducing portions of the wiring harness 51 into the storage space S (inner side portions of the grommets 81, 82) are secured to the bracket 47 using the wedge members 83,84. Thus, the portion of the wiring harness 51 drawn into the storage space S cannot be drawn out of the storage space S so that the slack of the wiring harness 51 is securely taken up within the storage space S.

Also in this embodiment, couplers 52*a*, 52*b* are secured in the upper part in the storage space S. That is to say as shown in FIG. 12, front and rear hooks 85, 86 spaced from each other by a suitable distance are attached to the top surface of the bracket 47. Portions, on both sides of the couplers 52*a* and 52*b*, of the wiring harness 51 are hung on the hooks 85, 86 to hold the wiring harness 51 generally horizontally. As a result, as described above, the couplers 52*a*, 52*b* are secured in the upper part in the storage space S.

Since the couplers 52*a*, 52*b* are secured and held in the upper part in the storage space S as described above, even if the wiring harness 51 slacks within the storage space S, the couplers 52*a*, 52*b* do not fall on the bottom of the storage space S where rain water, etc. collects so that high water-proof property is secured for the couplers 52*a*, 52*b* and electric troubles due to water are reliably prevented.

Figure 13:
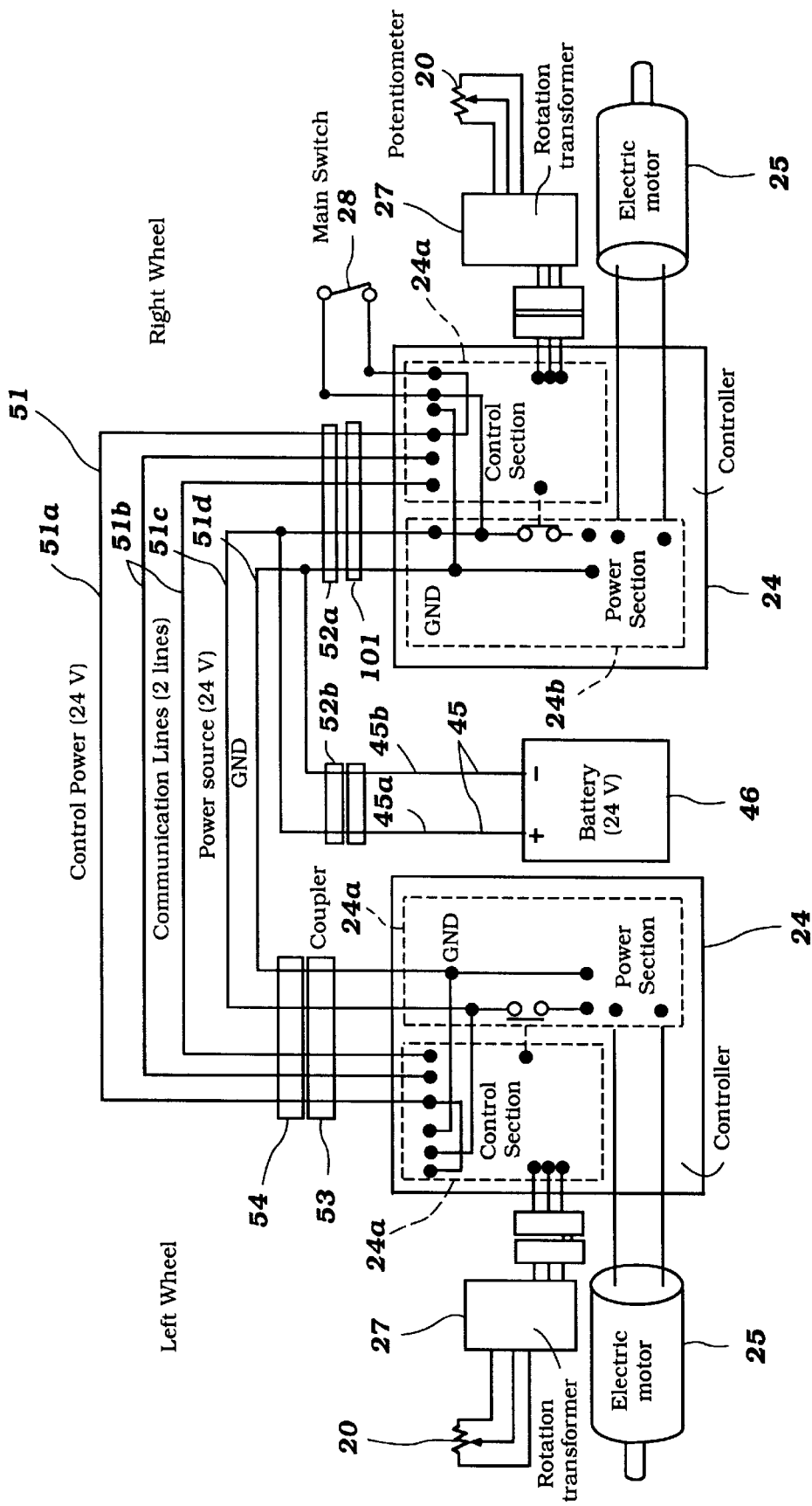
FIG. 13 is an electric wiring diagram of a motor-operated wheelchair of the invention.

Next, the electric wiring structure for the manually operated, motor-assisted wheelchair 1 of this embodiment will be described in reference to FIG. 13.

As shown, the wiring harness 51 is constituted as a bundle of five lines: a control power line 51*a*, two communication lines 51*b*, a power line 51*c*, and a ground line 51*d*. The control power line 51*a* and the communication lines 51*b* are connected to a control section 24*a* of the controller 24 provided in the electric motor unit of each of the right and left wheels 2. The power line 51*c* and ground line 51*d* are connected to a power section 24*b* of the controller 24. The wiring harness 45 is constituted as a bundle of a line 45*a* connected to the positive pole of the battery 46, and a line 45*b* connected to the negative pole of the battery 46. The lines 45*a*, 45*b* are respectively connected electrically through the coupler 52*b* to the power line 51*c* and the ground line 51*d* of the wiring harness 51.

The electric power supplied from the battery 46 to the power section 24*b* of each of the controllers 24 is supplied through a relay operated by a command from the control section 24*a* to an electric motor 25 so that the electric motor 25 is driven. The power supplied through the main switch 28 to the control section 24*a* is supplied through the rotation transformer 27 to the potentiometer 20. Detection signals from the potentiometer 20 are transmitted through the rotation transformer 27 to the control section 24*a*.

Next, the function of the manually operated, motor-assisted wheelchair 1 of this embodiment will be described.

Figure 4:
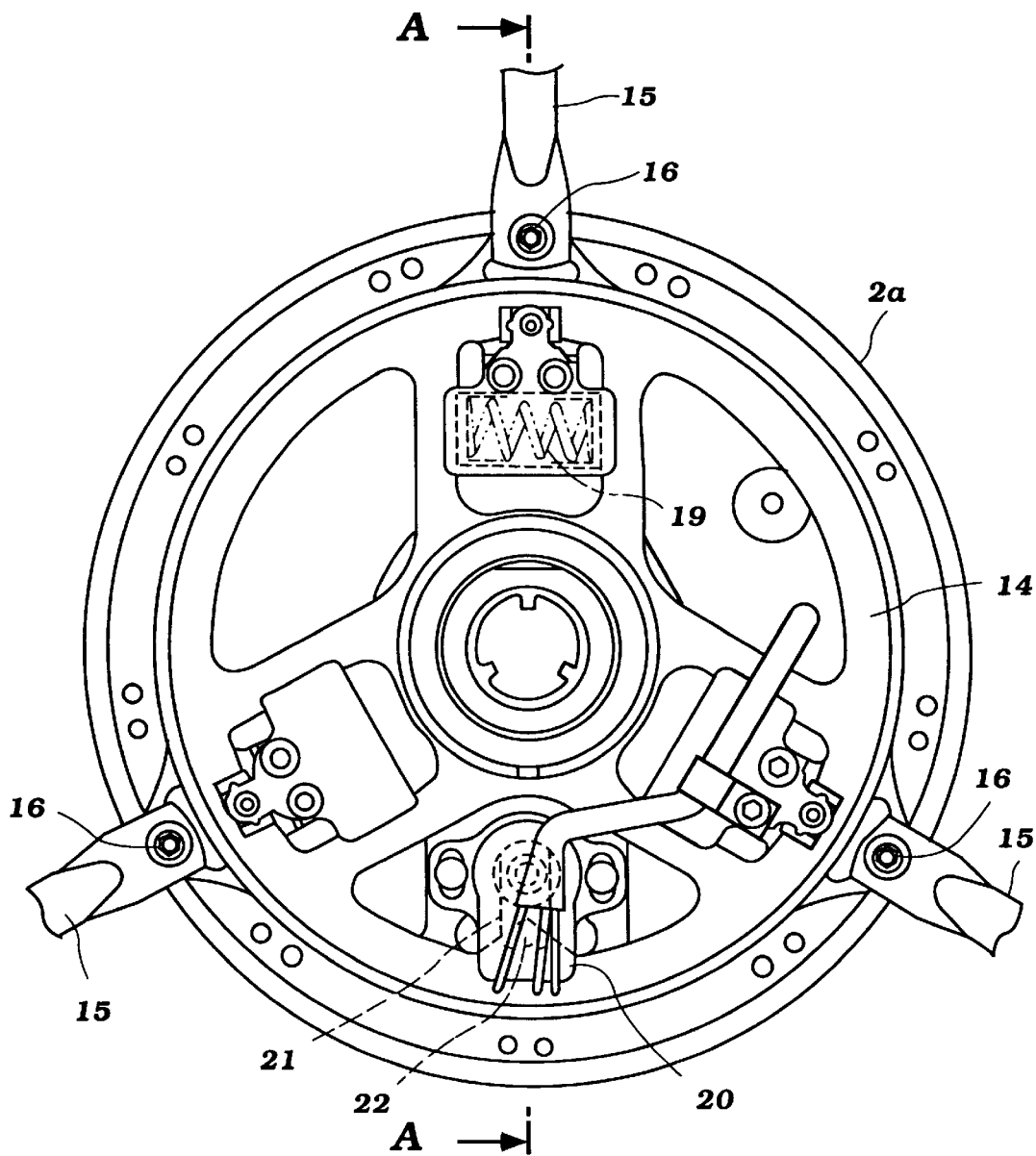
FIG. 4 is a side view as seen from inside of the wheel hub portion of the same wheelchair with the wheel cap removed.

When the rider applies forces by hand to the paired right and left hand rims 13 independently of each other in the forward direction, the spring 19 shown in FIGS. 4 and 5 is compressed and its reaction force is transmitted to the hub 2*a* and farther to the wheel 2.

In the above-described process, each of the hand rims 13 rotates by an angle commensurate with the compressive deformation amount of the spring 19 relative to the wheel 2. The relative rotation of the hand rim 13 is magnified by the lever 21 and transmitted to the potentiometer 20. Each of the potentiometers 20 sends detected signal in proportion to the relative rotation of each of the hand rims 13 through each of the rotation transformers 27 to the control section of each of the controller 24.

Since the compressive deformation amount of the spring 19 is in proportion to the manual force applied to the hand rim 13, the control section 24*a* of each of the controllers 24 calculates the magnitude of the manual force applied to the hand rim 13 from the detected signal in proportion to the relative rotation of the hand rim 13, sends a control signal commensurate with the magnitude of the manual force to the power section 24*b* to supply an electric power (current) commensurate with the detected manual force (torque) to each of the electric motors 25 so that the motor 25 is driven for rotation. Thus, the required assist power is provided.

When each of the electric motors 25 is driven as described above, the rotation is transmitted through the power transmission means including transmission mechanism G1, gears G2 and G3 to each of the right and left wheels 2. Then, each of the right and left wheels 2 is driven for rotation with a driving force which is the sum of the manual force and the assist power. As a result, the wheelchair 1 is driven forward while the rider easily applies for example only about a half the total driving force.

While the above description is made with respect to the function of the manually operated, motor-assisted wheelchair 1 in the forward movement, the function in the reverse movement is similar to that in the forward movement.

With the embodiment described above, external appearance of the motor assisted wheelchair 1 is improved, the number of electric cables and associated components is reduced to a minimum, the structure is simplified, and the ease of attaching and removing the wheels 2 is improved as the battery 2 and the electric motor unit including the electric motor 25 and the controller 24 is disposed on the wheel 2 side, and also the main switch 28 is included in the electric motor unit.

While the present embodiment uses a long switch lever 29 for actuating the main switch 28, such a long switch lever 29 is not always necessary but may be replaced with a known button switch disposed on the side of the stationary disk 23 facing the vehicle body. Such an arrangement should also be included in the scope of invention. Also, the main switch 28 may be included in the electric motor unit located on the side opposite the side on which the battery 46 is located. In some cases, both of the electric motor units may include the main switches 28.

Figure 14:
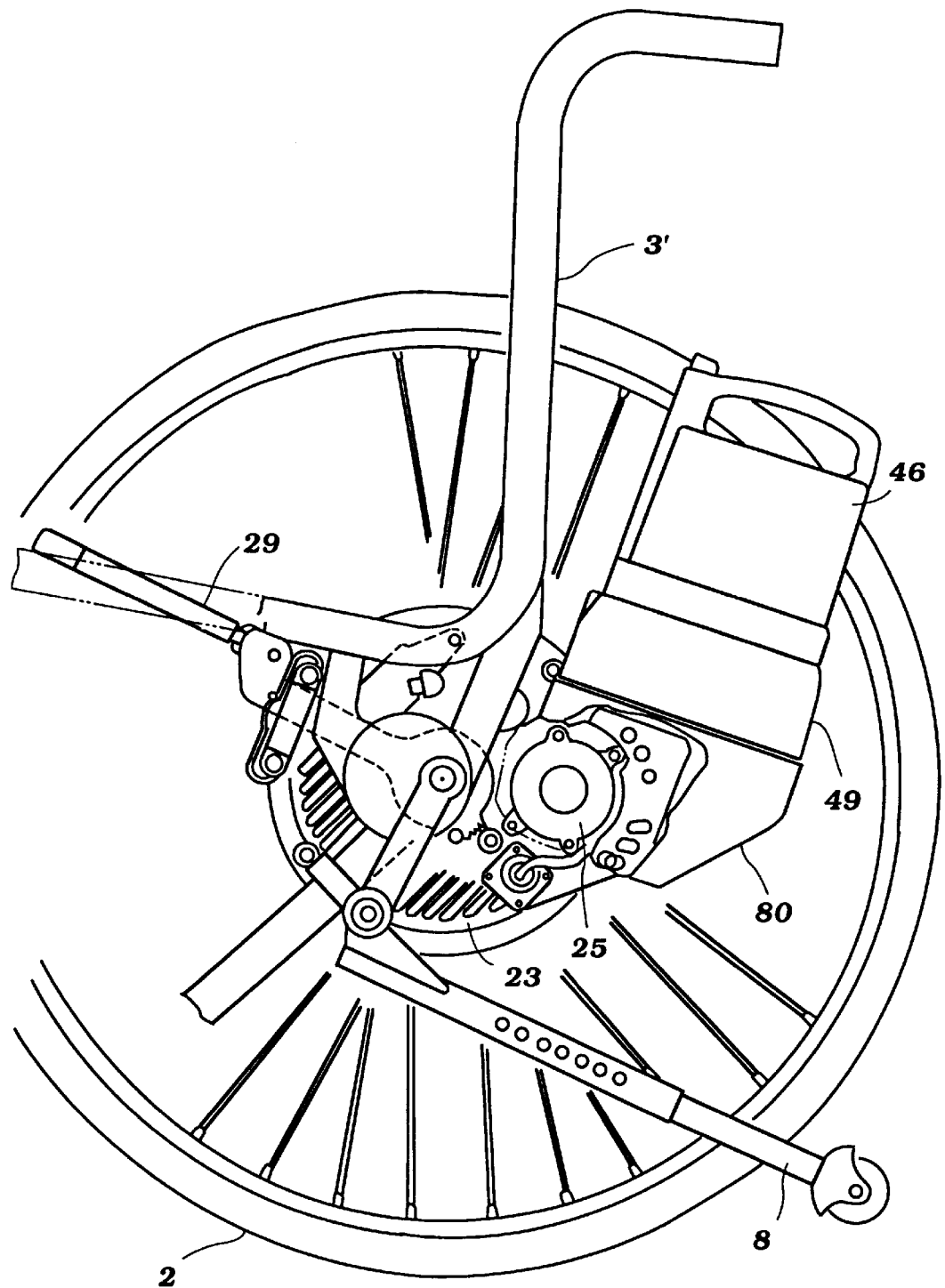
FIGS. 14 and 15 are side views as seen from inside of the right hand wheel to show how the switch lever is used.
Figure 15:
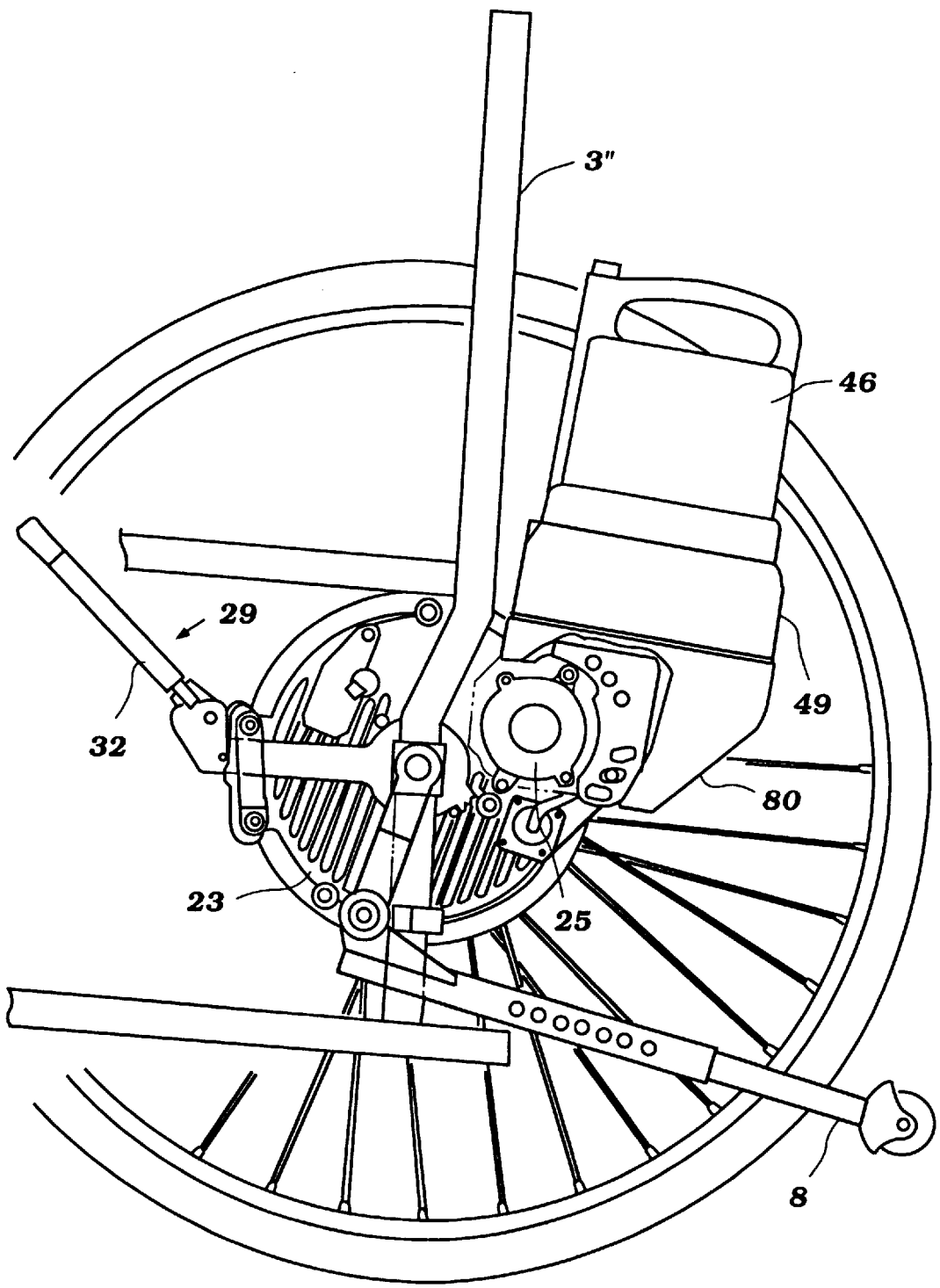

In this embodiment, the switch lever 29 which is adjustable both in its length and direction may flexibly adapt to different sizes and shapes of the vehicle body frame 3. To show a few examples, in a wheelchair having a vehicle body frame 3' shown in FIG. 14, both the attachment angle and the length of the switch lever 29 may be changed, and in a wheelchair having a vehicle body frame 3" shown in FIG. 15, the lever portion 32 of the switch lever 29 may be bent upward with an obtuse angle so that the entire lever 29 is in the shape of an elbow as seen in the side view. Here, FIGS. 14 and 15 are side views as seen from inside the right hand wheel 2 to show the manner of use of the switch lever 29. In those drawings, the same elements as those used in FIG. 6 are provided with the same symbols.

Also in the present embodiment, the pilot lamp 41 for informing the rider of the remaining battery capacity, occurrence of troubles, etc. is also disposed together with the main switch 28 and the switch lever 29 on the wheel 2 side, and therefore, the structure is simplified and the ease of attaching and removing the wheel 2 is farther improved.

Figure 16:
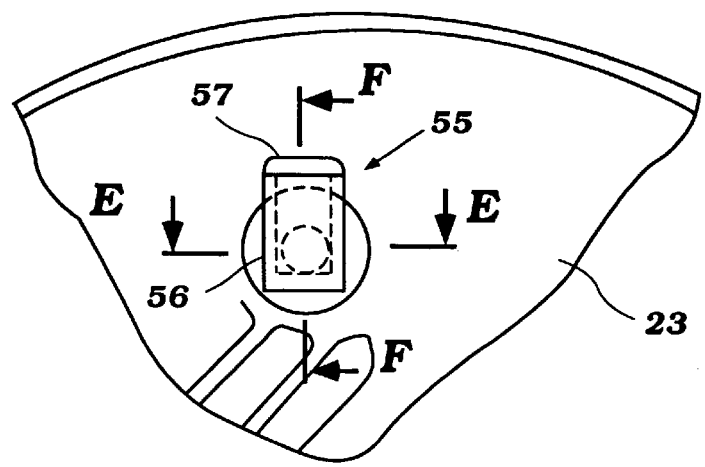
FIG. 16 is a side view as seen from inside of the essential part of the right hand wheel to show another example of the location of the display section.
Figure 17:
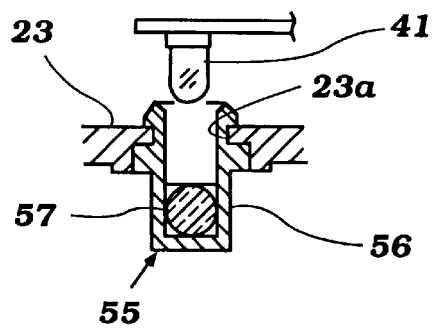
FIG. 17 shows a cross section E—E in FIG. 16.
Figure 18:
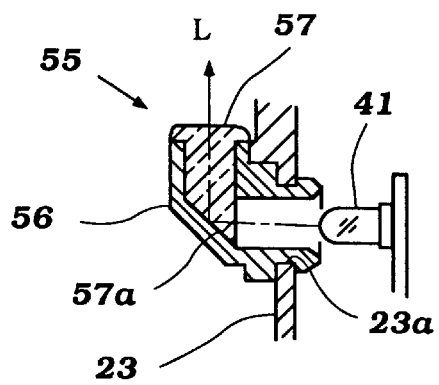
FIG. 18 shows a cross section F—F in FIG. 16.

By the way, while the pilot lamp 41 is embedded in the fore-end portion of the switch lever 29 in the above-described embodiment, the pilot lamp 41 may also be installed as shown in FIG. 16 through FIG. 18 on the inside (hub side) of the stationary disk 23, and the display section 55 may by installed on the outside (on the side facing the vehicle body frame 3) of the stationary disk 23.

That is to say, FIG. 16 is a side view of the stationary disk 23 similar to that shown in FIG. 6 as seen from inside (vehicle body frame side). FIG. 17 shows a section E—E in FIG. 16. FIG. 18 shows a section F—F in FIG. 16. A case 56 constituting the display section 55 is fit in a round hole 23a bored in the stationary disk 23. A transparent lens 57 is held with the case 56. The underside 57a of the lens 57 is tilted by an angle of 45 degrees so that the light L from the pilot lamp 41 is reflected as shown in FIG. 18 on the underside 57a of the lens 57, bent upward by 45 degrees, and emitted upward from the lens 57.

Therefore, the rider may get information such as the remaining battery capacity from the lighting state of the pilot lamp 41 in the display section 55. In that case, since the display section is disposed inside the wheel tire where it is darker than outside, the rider may securely recognize the light L emitted from the display section 55.

Figure 19:
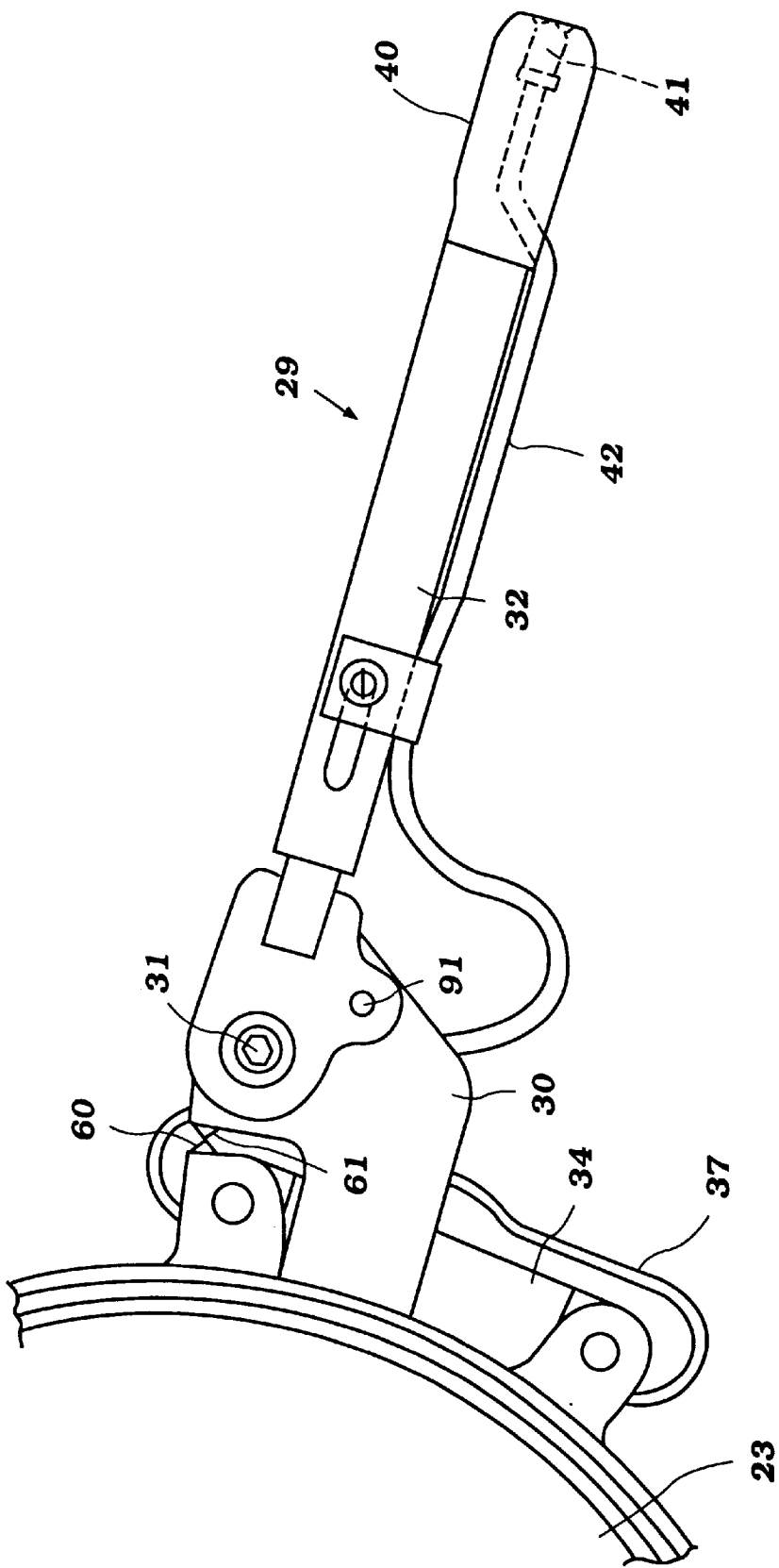
FIG. 19 is a partial side view to show another embodiment of the switch lever.

Alternatively, it may also be arranged that projections 60, 61 are formed on parts of the stationary disk 23 and the switch lever 29 facing each other so that the on or off state of the main switch 28 (See FIG. 7.) may be visually confirmed from the aligning state between both projections 60, 61. In FIG. 19, the same elements as those in FIG. 11 are provided with the same symbols.

While the above description is made specifically with respect to the manually operated, motor-assisted wheelchair, this invention may also be applied to motor-operated wheelchairs continuously receiving driving forces from an electric motor according to joystick operation.

Industrial Applicability

As described above, this invention provides a motor-operated wheelchair capable of reducing the number of electric cables and associated components to a minimum, simplifying the structure, and facilitating attachment and removal of the wheels.

According to the invention, the wheels may be attached to and removed from the motor-operated wheelchair easily without play or noise.

This invention also provides a motor-operated wheelchair in which the slack of the electric cable due to a surplus length may be taken up and electrical troubles due to water may be prevented.

What is claimed is:

1. A motor-operated wheelchair having a frame, a seat provided by said frame for accommodating a seated rider, said frame journaling right and left drive wheels, each of said drive wheels being provided with an electric motor unit including an electric motor for driving the respective drive wheel and control means for controlling the respective electric motor, a battery disposed only on one electric motor unit for supplying electric power to the control means for the adjacent drive wheel, said battery supplying electric power to the control unit of the other of said drive wheels through electric cables and a main switch integrated with only one of electric motor units for controlling the supply of electric power from said battery to both of said control units.

2. A motor-operated wheelchair of claim 1, further including a switch lever carried by at least the electric motor unit disposed on the side where the battery is disposed for actuating the main switch, said switch lever being accessible by a rider in the seat.

3. A motor-operated wheelchair of claim 2, characterized in that the switch lever is adjustable in its length and direction.

4. A motor-operated wheelchair of claim 2, characterized in that a display section is provided at the fore-end of the switch lever.

5. A motor-operated wheelchair of claim 1, characterized in that a display section is disposed between the seat and at least one of the drive wheels to display information to a seated rider.

6. A motor-operated wheelchair of claim 5, characterized in that the display section is constituted by an LED.

7. A motor-operated wheelchair of claim 1, characterized in that a hand wheel is associated with each of said drive wheels for manual operation thereof by a seated rider, each hand wheel being comprised of a hand rim, a hub portion and spokes supporting said hand rim from said hub portion, said spokes being curved outwardly of said seat along the radial outer portion thereof where they join said hand rim.

8. A motor-operated wheelchair of claim 1, characterized in that each of the wheels is from the frame and that a projection provided on the electric motor unit at a position spaced radially from a motor shaft of the electric motor unit is connected to the frame through an elastic body.

9. A motor-operated wheelchair of claim 8, characterized in that the projection comprises a circular columnar pin carried by the electric motor unit, and further including a metallic attachment case attached to the frame is formed with coaxially disposed circular holes of different diameters, and the elastic body comprises a circular cylindrical rubber damper having an inside diameter approximately the same as the outside diameter of said pin is fitted into a circular hole of a larger diameter, the diameter of the smaller hole is set to be greater than the inside diameter of the rubber damper, and the pin is inserted into the rubber damper and the smaller circular hole of the attachment case.

10. A motor-operated wheelchair of claim 8, characterized in that the projection comprises a circular columnar pin carried by the electric motor unit, and further including holes of different sizes elongate in the direction generally normal to the line of action of drive reaction force of the electric motor unit formed in a metallic attachment case attached to the frame, and the elastic body comprises a circular cylindrical rubber damper having an inside diameter approximately the same as the outside diameter of said pin fitted into an elongate hole of a larger size, and said pin is inserted into the rubber damper and the smaller diameter circular hole of the attachment case.

11. A motor-operated wheelchair of claim 1, characterized in that a storage space is formed below a battery holder for receiving a battery, and part of the electric cable is stored in the storage space to adjust the length of the electric cable.

12. A motor-operated wheelchair of claim 11, characterized in that a coupler for interconnecting the electric cables is secured and held in the upper part in the storage space.

13. A motor-operated wheelchair of claim 11, characterized in that electric cable securing means is provided on part of the electric cable in the area where the cable is introduced into the storage space.

* * * * *